Figure 1:
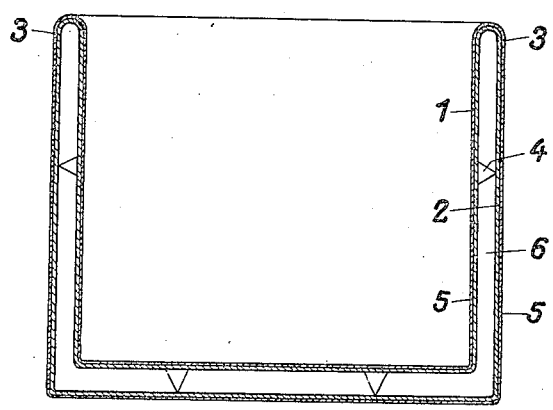

Feb. 16, 1937.   H. J. MOCZALA   2,070,672
METHOD OF PRODUCING DOUBLE WALL VESSELS OF CERAMIC MATERIAL
AND WITH RAREFACTION OF THE AIR WITHIN THE WALL SPACES
Filed Feb. 8, 1935

Inventor:
HANS JOSEF MOCZALA
By Kiddle, Bethell and Montgomery
ATTORNEYS

Patented Feb. 16, 1937

2,070,672

UNITED STATES PATENT OFFICE 2,070,672

METHOD OF PRODUCING DOUBLE-WALL VESSELS OF CERAMIC MATERIAL AND WITH RAREFACTION OF THE AIR WITHIN THE WALL SPACES

Hans Josef Moczala, Berlin, Germany

Application February 8, 1935, Serial No. 5,598
In Germany October 9, 1933

4 Claims. (Cl. 25—156)

My invention relates to a method of producing double-wall vessels of ceramic material, such as porcelain, clay or the like, and with rarefaction of the air within the wall spaces.

It has already been proposed to produce double-wall vessels of this kind whereby in accordance with the known manufacture of double-wall vessels or bottles of glass an opening is left free at the bottom of the vessel. After evacuation of the air this opening is hermetically sealed.

This procedure, however, is not satisfactory because of the reason that by the sealing of the evacuation opening the quality of the material is diminished and the density of that portion of the outer wall, in which the opening had been provided, was reduced.

According to the present invention the manufacture of double-wall vessels of ceramic material is effected without using a mechanical or artificial evacuation of the hollow wall spaces. The invention is based upon the facts that the unbaked double-wall shard or raw vessel is pervious to air even after the application of raw glazing mass, and that the rarefaction of the air enclosed in the hollow wall spaces due to the baking temperature leads to a degree of evacuation which is sufficiently high to be satisfactory for all practical purposes.

According to the new method of producing double-wall vessels, the shard is manufactured as a double-wall body the walls of which are closed on all sides, the shard then being baked in the usual manner after the application of raw glazing mass.

The manufacture of the shard may be carried out in any desired manner. At the time when the raw glazing mass is applied the closed hollow wall space is filled with air. By increasing the temperature up to the baking temperature the pressure of the enclosed volume of air is increased so that part of the air is driven through the porous walls of the shard into the atmosphere until the raw glazing mass liquefies and closes the pores of the shard. The liquefying of the glazing mass takes place as known in the art at a temperature of about 1300–1400° C. At this temperature the weight of the air enclosed in the hollow wall is reduced to a fraction of its original weight, and the rarefaction of the air obtained by cooling the baked vessel wholly suffices, as proved by tests, to secure the desired heat insulation which nearly corresponds to that of hollow-wall vessels the wall space of which is completely evacuated.

For manufacturing vessels the walls of which are not intersected it is advisable to produce both walls separately from each other and to connect their edge portions after the inner wall has been put into the interior of the outer wall. Distance pieces are preferably provided between the two walls which secure the desired space between the walls and support the inner wall. These pieces may be fixed in advance to the inner wall.

In the manufacture of vessels with intersected walls it has been found practical, to manufacture firstly the inner wall and to bake it. The inner wall is then used as a core for manufacturing the outer wall by casting. The two walls are connected with each other at their edge portions; then the raw glazing mass is applied and the shard baked. Distance or spacer pieces may be used as already mentioned in connection with the manufacture of vessels the walls of which are not intersected.

The object of the invention will be more easily understood from the following description of double-wall vessels illustrated in the accompanying drawing. In the drawing Fig. 1 is a longitudinal section of a double-wall vessel the walls of which are not intersected, Fig. 2 is a longitudinal section of a double-wall vessel with intersected walls.

The vessel shown in Fig. 1 comprises an inner wall 1 and an outer wall 2. The two walls are separately manufactured and connected with each other at their edge portions as shown at 3. The inner wall is held spaced from the outer wall by distance pieces 4. The shard is coated with a raw glazing mass and then baked whereby a glazing layer 5 is produced which wholly covers the surface of the vessel so that the walls 1 and 2 become impervious to air. During the baking process,—the highest temperature is about 1300–1400° C.—part of the air which is enclosed in the hollow space 6 is driven through the pores of the walls 1 and 2 and through the raw glazing mass into the atmosphere. As soon as the said glazing mass liquefies, i. e. as soon as the glazing layer 5 is created, the hollow space 6 is hermetically sealed thereby so that by cooling the baked vessel a rarefaction of the air within the space 6 is obtained.

Figure 2:
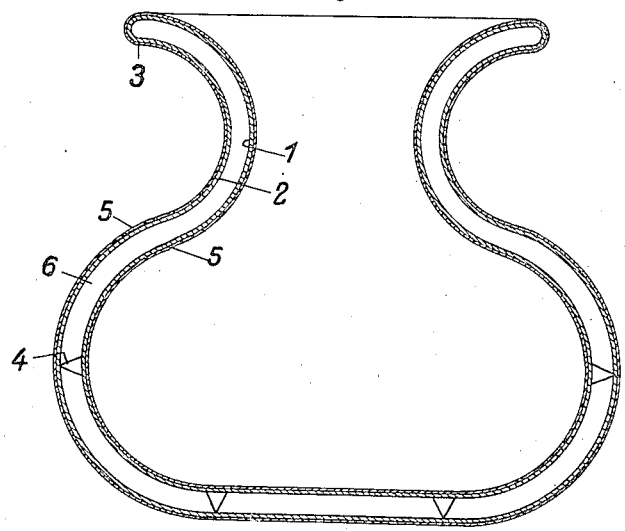

It will be understood that this kind of manufacture cannot be used if the walls of the vessel are intersected as shown in Fig. 2. In this case the procedure is as follows:

The inner wall 1 is manufactured in advance preferably by casting and then baked. The inner wall is then used as a core for casting the outer wall 2. The baking of the inner wall shard is preferred as otherwise the mud from which the outer wall shard is formed, and which fills the space between the core and the mould surface confining the outer wall to be produced, would settle upon the surface of the inner wall shard. The same result could be obtained by incomplete baking (biscuit baking) of the inner wall, in which event, however, the surface of the inner wall must be protected against the settlement of mud by a tightening layer of combustible material, such as paraffin. The further steps of manufacture are the same which have been described in connection with Fig. 1.

What I claim, is:

1. A method of producing double-wall vessels of ceramic material and with rarefaction of the air within the wall spaces which method comprises manufacturing the raw walls separately, placing one wall inside the other, connecting the air pervious walls with each other at their edge portions, applying a raw glazing mass to the surface of the shard thus produced and then heating to a sufficiently high temperature to drive part of the air within the wall spaces through the said walls followed by a sealing of the walls by said glazing material.

2. A method as defined by claim 1 in which spacing pieces are inserted between the two walls.

3. A method of producing intersected double-wall vessels of ceramic material and with rarefaction of the air within the wall space which comprises manufacturing the inner wall, baking the said inner wall, casting the outer wall around the said inner wall, connecting the walls with each other at their edge portions, applying a raw glazing mass to the surface of the shard thus produced and baking the shard thus produced at a sufficiently high temperature to drive part of the air between the walls out through the porous outer wall, followed by a sealing of said outer wall with said glazing material.

4. A method as defined by claim 3 in which the inner wall is incompletely baked and provided with a tightening layer of combustible material.

HANS JOSEF MOCZALA.